United States Patent
Lee et al.

(10) Patent No.: US 9,300,459 B2
(45) Date of Patent: Mar. 29, 2016

(54) METHOD AND APPARATUS FOR CONTROLLING DEACTIVATION TIMER OF CELL

(71) Applicant: LG Electronics Inc., Seoul (KR)

(72) Inventors: Sun Young Lee, Anyang-si (KR); Sung Jun Park, Anyang-si (KR); Sung Hoon Jung, Anyang-si (KR); Young Dae Lee, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/384,982

(22) PCT Filed: Mar. 14, 2013

(86) PCT No.: PCT/KR2013/002068
§ 371 (c)(1),
(2) Date: Sep. 12, 2014

(87) PCT Pub. No.: WO2013/137666
PCT Pub. Date: Sep. 19, 2013

(65) Prior Publication Data
US 2015/0030008 A1    Jan. 29, 2015

Related U.S. Application Data

(60) Provisional application No. 61/611,551, filed on Mar. 15, 2012.

(51) Int. Cl.
*H04W 56/00* (2009.01)
*H04W 72/04* (2009.01)
(Continued)

(52) U.S. Cl.
CPC ............ *H04L 5/0078* (2013.01); *H04L 5/0032* (2013.01); *H04W 56/0045* (2013.01); *H04W 72/02* (2013.01); *H04W 72/0446* (2013.01); *H04W 74/0833* (2013.01)

(58) Field of Classification Search
CPC .................. H04W 56/0045; H04W 56/0015; H04W 72/04; H04W 72/02; H04W 72/0446; H04W 74/0833; H04L 5/001; H04L 5/0032; H04L 5/0091; H04L 5/0078
USPC ......................................................... 370/336
See application file for complete search history.

(56) References Cited

U.S. PATENT DOCUMENTS 8,917,664 B2 * 12/2014 Jang et al. ..................... 370/328
2010/0144363 A1    6/2010 De Rosa et al.
(Continued)

FOREIGN PATENT DOCUMENTS

KR    10-2011-0109148    10/2011

OTHER PUBLICATIONS

InterDigital Communication LLC, 3GPP TSG-RAN WG2 Meeting #70 Montreal, Canada, Apr. 12-16, 2010.*
(Continued)

*Primary Examiner* — Edan Orgad
*Assistant Examiner* — Vanneilian Lalchinthang
(74) *Attorney, Agent, or Firm* — Dentons US LLP

(57) ABSTRACT

The present specification proposes a technique for controlling a deactivation timer of a cell. Specifically, the present specification proposes a method for controlling a deactivation timer of a cell in a mobile communication system. The method comprises the steps of: configuring a primary cell and at least one secondary cell on user equipment (UE); receiving, from the UE, an indicator related to a deactivation timer for one secondary cell from among one or more secondary cells; and disabling, on the UE, the deactivation timer of one secondary cell on the basis of the indicator.

6 Claims, 14 Drawing Sheets

(51) Int. Cl.
*H04L 5/00* (2006.01)
*H04W 72/02* (2009.01)
*H04W 74/08* (2009.01)

(56) References Cited

U.S. PATENT DOCUMENTS

2012/0082107 A1* 4/2012 Ou et al. .................. 370/329
2012/0281680 A1* 11/2012 Bostrom et al. ............ 370/336
2013/0114574 A1* 5/2013 Ng et al. .................. 370/336
2013/0265991 A1* 10/2013 Dinan ....................... 370/336

OTHER PUBLICATIONS

"Timer Based Secondary Serving HS-DSCH Cell Deactivation", 3GPP TSG-RAN WG2 Meeting #70, R2-103188; Interdigital Communications, LLC; Montreal, CA, 12-16; Apr. 16, 2010.

"Consideration on Open Issues for SCell TAT", 3GPP TSG-RAN WG2 Meeting #75bis, R2-114905, Zhuhai, China, 10-14; Oct. 14, 2011; New Postcom.

"Timer Based Implicit Deactivation for 4C-HSDPA", 3GPP TSG RAN WFI Meeting #61bis, R1-104114, Dresden, Germany, Jun. 28, 2010-Jul. 2, 2010.

CATT: "Deactivation Timer Handling for Timing Reference Cell", 3GPP TSG RAN WG2 Meeting #77, R2-120253, Feb. 6-10, 2012.

Nokia: "Timing Reference for sTAG", 3GPP TSG-RAN WG2 Meeting #77, R2-120086, Feb. 6-10, 2012.

3GPP TS 36.321 V10.5.0 (Mar. 2012), 3rd Generation Partnership Project; Technical Specification Group Radio Access Network; Evolved Universal Terrestrial Radio Access (E-UTRA); Medium Access Control (MAC) protocol specification (Release 10).

* cited by examiner

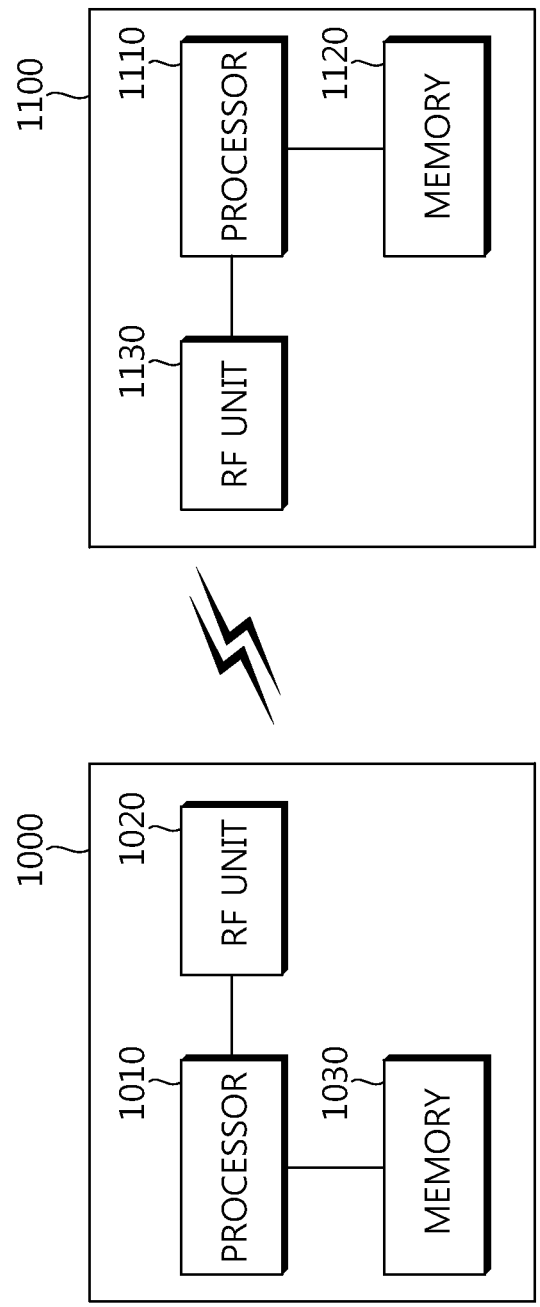

METHOD AND APPARATUS FOR CONTROLLING DEACTIVATION TIMER OF CELL

This application is a 35 USC §371 National Stage entry of International Application No. PCT/KR2013/002068 filed on Mar. 14, 2013, and claims priority to U.S. Provisional Application No. 61/611,551 filed on Mar. 15, 2012, all of which are hereby incorporated by reference in their entireties as if fully set forth herein.

BACKGROUND OF THE INVENTION

1. Field of the Invention

The present invention relates to a method of controlling a deactivation timer of a cell, and more particularly, to a method and apparatus for controlling a deactivation timer of at least one secondary cell by disabling/prohibiting the deactivation timer.

2. Related Art

One of requirements of a wireless communication system is to support a high data rate. For this, various techniques such as multiple input multiple output (MIMO), cooperative multiple point transmission (CoMP), relay, carrier aggregation (CA), etc., have been under research.

In concept, the CA aggregates a plurality of bands into one system. In this case, a band that can be independently operated may be called a component carrier (CC). The plurality of carriers may correspond to a plurality of cells. The cell may be managed by being divided into various types of cells such as a primary cell and a secondary cell.

SUMMARY OF THE INVENTION

The present specification proposes to improve a method of controlling a deactivation timer of a cell. More specifically, it is proposed a method and apparatus for maintaining an activation state of a specific cell in a timing advance group (TAG) consisting of only a secondary cell (i.e., sTAG) in a carrier aggregation (CA) technology of a long term evolution (LTE) system which uses multiple uplink timing advances.

The present application proposes a method of controlling a deactivation timer of a cell. In detail, the present application proposes a method of controlling a deactivation timer of a cell in a mobile communication system. The method comprises: configuring, at a user equipment (UE), a primary cell and at least one secondary cell; receiving, at the UE, an indicator associated with the deactivation timer of one secondary cell among the at least one secondary cell; and disabling, at the UE, the deactivation timer of said one secondary cell based on the indicator.

Additionally or alternatively, the indicator is received via radio resource control (RRC) signaling or medium access control (MAC) signaling, which indicates said one secondary cell.

Additionally or alternatively, the indicator indicates an index of said one secondary cell.

Additionally or alternatively, the at least one secondary cell is included in a secondary timing advance group (TAG).

Additionally or alternatively, the indicator indicates an index of the secondary TAG.

Additionally or alternatively, said one secondary cell is a timing reference cell of the secondary TAG.

Additionally or alternatively, the deactivation timer of said one secondary cell is disabled by applying an infinite time value to the deactivation timer.

Additionally or alternatively, the at least one secondary cell includes a first secondary cell configured with random access channel (RACH) configuration and a second secondary cell not configured with RACH configuration, wherein the deactivation timer of the first secondary cell is disabled upon receiving the indicator.

Additionally or alternatively, the at least one secondary cell includes a first secondary cell and a second secondary cell, wherein the indicator includes random access channel (RACH) configuration for the first secondary cell, wherein the deactivation timer of the first secondary cell is disabled upon receiving the indicator.

Additionally or alternatively, the at least one secondary cell includes a first secondary cell and a second secondary cell, wherein the indicator includes a physical downlink control channel (PDCCH) order initiating random access on the first secondary cell, wherein the deactivation timer of the first secondary cell is disabled after successfully completing the random access on the first secondary cell.

Additionally or alternatively, after the deactivation timer of the first secondary cell is disabled, a PDCCH order initiating random access on the second secondary cell is further received, wherein the deactivation timer of the second secondary cell is disabled after successfully completing the random access on the second secondary cell.

Additionally or alternatively, a finite time value is applied to the deactivation timer of the first secondary cell after successfully completing the random access on the second secondary cell.

Additionally or alternatively, the indicator indicates time duration during which the deactivation timer of said one secondary cell is disabled.

The present application also proposes a user equipment (UE) for controlling a deactivation timer of a cell in a mobile communication system. The UE comprises a transceiver configured to receive and/or transmit a signal; and a processor coupled to the transceiver and configured to: configure a primary cell and at least one secondary cell; receive an indicator associated with the deactivation timer of one secondary cell among the at least one secondary cell; and disable the deactivation timer of said one secondary cell based on the indicator.

BRIEF DESCRIPTION OF THE DRAWINGS

FIG. 14 shows an apparatus to which the aforementioned method is applied.

DESCRIPTION OF EXEMPLARY EMBODIMENTS

The present document provides a transmission method and apparatus for controlling a timer in a wireless communication system, in particular, a wireless communication system supporting a carrier aggregation (CA). For clarity, the following description is based on 3$^{rd}$ generation partnership project (3GPP) long term evolution (LTE) supporting the CA and an evolution thereof, but the present invention is not limited thereto.

LTE of the 3GPP standard organization is a part of an evolved-universal mobile telecommunications system (E-UMTS) using an evolved-universal terrestrial radio access network (E-UTRAN). The LTE employs an orthogonal frequency division multiple access (OFDMA) in a downlink and employs single carrier-frequency division multiple access (SC-FDMA) in an uplink. LTE-advanced (LTE-A) is an evolution of the LTE.

Figure 1:
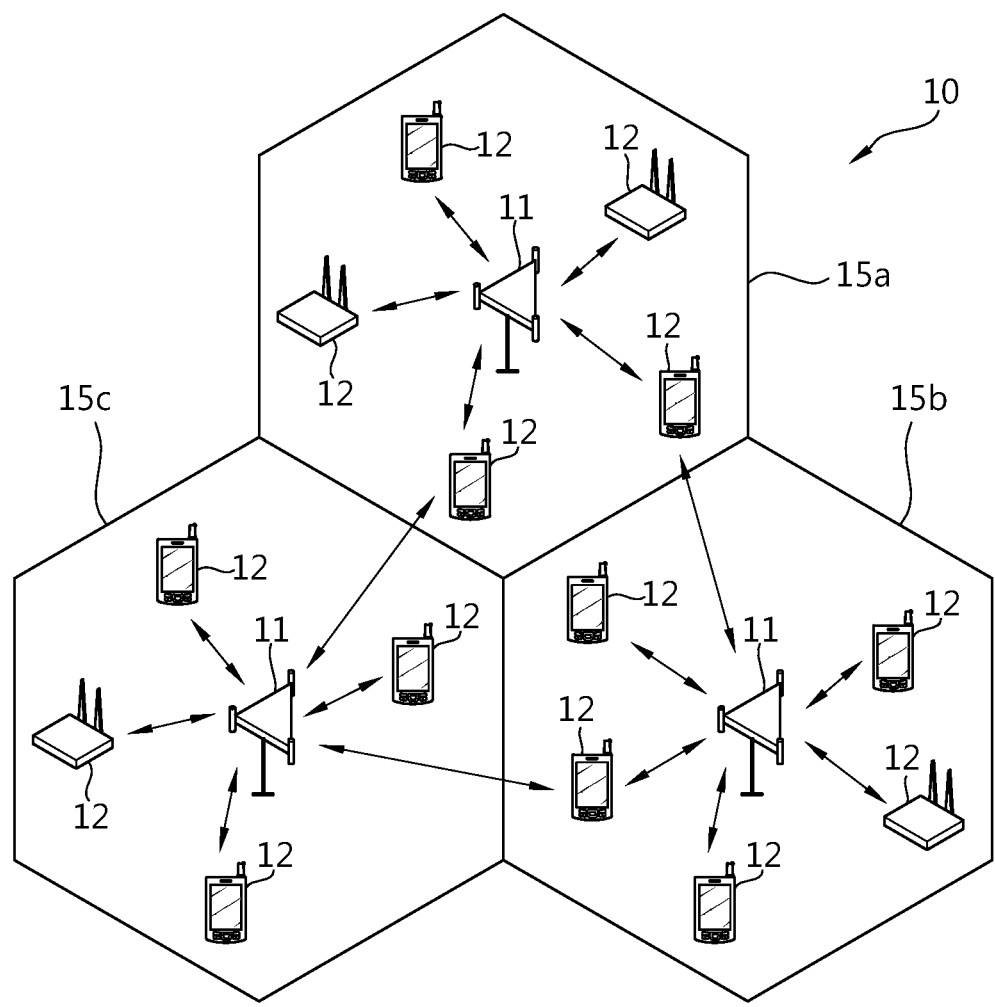
FIG. 1 shows a wireless communication system.

FIG. 1 shows a wireless communication system.

Referring to FIG. 1, a wireless communication system 10 includes at least one base station (BS) 11. Each BS 11 provides a communication service to a specific geographical region 15 which is generally called a cell. The cell can be divided into a plurality of regions, each of which is called a sector. One or more cells may exist in one BS. The BS 11 is generally a fixed station that communicates with a user equipment (UE) 12 and may be referred to as another terminology, such as an evolved node-B (eNB), a base transceiver system (BTS), an access point, an access network (AN), etc.

The UE 12 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc.

Hereinafter, a downlink (DL) implies communication from the BS 11 to the UE 12, and an uplink (UL) implies communication from the UE 12 to the BS 11.

The wireless communication system 10 may be a system supporting bidirectional communication. The bidirectional communication may be performed by using a time division duplex (TDD) mode, a frequency division duplex (FDD) mode, etc. When in the TDD mode, UL transmission and DL transmission use different time resources. When in the FDD mode, UL transmission and DL transmission use different frequency resources. The BS 11 and the UE 12 communicate with each other by using a radio resource called a radio frame.

The system of FIG. 1 may be implemented by an LTE system. In this case, a structure of the LTE system may be classified into an evolved UMTS terrestrial radio access network (E-UTRAN) and an evolved packet core (EPC). The E-UTRAN consists of a UE and an evolved NodeB (eNB). An interface between the UE and the eNB may be called a Uu interface. An interface between one eNB and another eNB may be called an X2 interface. The EPC may consist of a mobility management entity (MME) serving for a control-plane function and a serving gateway (S-GW) serving for a user-plane function. Meanwhile, an interface between the eNB and the MME may be called an S1-U interface, and an interface between the eNB and the S-GW may be called an S1-U interface. The two interfaces may be collectively called an S1 interface.

Figure 2:
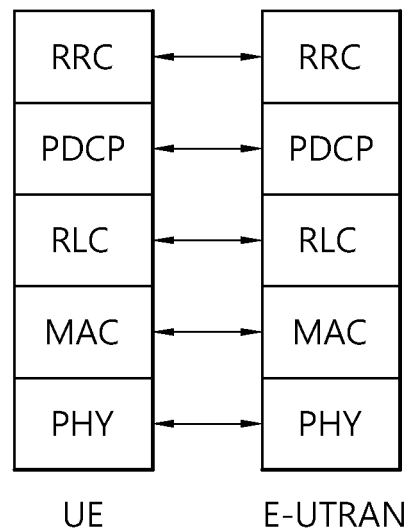
FIG. 2 is a diagram showing a control plane of a radio interface protocol.
Figure 3:
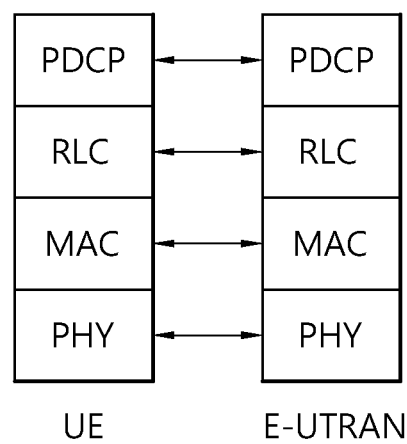
FIG. 3 is a diagram showing a user plane of a radio interface protocol.

A radio interface protocol is defined in the Uu interface which is a radio section. The radio interface protocol horizontally consists of a physical layer, a data link layer, and a network layer, and is vertically divided into a user plane (U-plane) for user data transmission and a control plane (C-plane) for control signal delivery (signaling). On the basis of the three lowest layers of a well-known open system interconnection (OSI) standard model, as shown in FIG. 2 and FIG. 3, the radio interface protocol can be generally divided into a first layer (L1) including a physical (PHY) layer, a second layer (L2) including medium access control (MAC)/radio link control (RLC)/packet data convergence protocol (PDCP) layers, and a third layer (L3) including a radio resource control (RRC) layer. These layers are present in pair in a UE and an E-UTRAN, and serve for data transmission of the Uu interface.

FIG. 2 is a diagram showing a control plane of a radio interface protocol.

FIG. 3 is a diagram showing a user plane of a radio interface protocol.

Respective layers will be described below with reference to FIG. 2 and FIG. 3.

A PHY layer, which is a first layer, provides an information transfer service to a higher layer by using a physical channel. The PHY layer is connected with a higher layer, i.e., a MAC layer, through a transport channel. Data between the MAC layer and the PHY layer is transferred through the transport channel. In this case, the transport channel is roughly divided into a dedicated transport channel and a common transport channel according to whether to share the channel. Further, between different PHY layers, i.e., between a PHY layer of a transmitting side and a PHY layer of a receiving side, data is transferred through a physical channel by using a radio resource.

There are several layers in the second layer. First, a MAC layer serves to map various logical channels to various transport channels, and also serves to perform logical channel multiplexing in which several logical channels are mapped to one transport channel. The MAC layer is connected with a higher layer, i.e., an RLC layer, through a logical channel. According to a type of information to be transmitted, the logical channel is roughly divided into a control channel for transmitting information of the C-plane and a traffic channel for transmitting information of the U-plane.

An RLC layer of the second layer serves to regulate a data size so that the data size is suitable to transmit data by a lower layer to a radio section by segmenting and concatenating data received from a higher layer. In addition, to ensure a variety of quality of service (QoS) required by each radio bearer (RB), the RLC layer provides three operation modes, i.e., a transparent mode (TM), an unacknowledged mode (UM), and an acknowledged mode (AM). In particular, the AM RLC performs a retransmission function by using an automatic repeat request (ARQ) for reliable data transmission.

A PDCP layer of the second layer performs a header compression function for decreasing an Internet protocol (IP) packet header size which is relatively great and which contains unnecessary control information in order to effectively perform transmission in a radio section having a small bandwidth when transmitting an IP packet such as IPv4 or IPv6. This serves to increase transmission efficiency of the radio section by allowing only necessary information to be transmitted in a header part of data. In addition, in the LTE system, the PDCP layer also performs a security function which consists of ciphering for avoiding data interception and integrity protection for avoiding data manipulation of a third party.

An RRC layer located in the uppermost part of the third layer is defined only in the C-plane. The RRC layer serves to control the logical channel, the transport channel, and the physical channel in association with configuration, reconfiguration and release of radio bearers (RBs). Herein, the RB implies a logical path provided by the first and second layers for data delivery between the UE and the UTRAN. In general, the setup of the RB implies a process for specifying a radio protocol layer and channel properties required to provide a particular service and for determining respective detailed parameters and operations. The RB can be classified into two types, i.e., a signaling RB (SRB) and a data RB (DRB). The SRB is used as a path for transmitting an RRC message in the C-plane. The DRB is used as a path for transmitting user data in the U-plane.

Hereinafter, a carrier aggregation of an LTE-A system is described. For clarity, hereinafter, the carrier aggregation is simply called a CA.

An LTE-A technical standard is an IMT-advanced candidate technique of an international telecommunication union (ITU), and is designed to conform to an IMT-advanced technical requirement of the ITU. Accordingly, it is under discussion in LTE-A to extend a bandwidth in comparison with the legacy LTE system in order to satisfy the ITU requirement. To extend the bandwidth in the LTE-A system, a carrier that can be used in the legacy LTE system is defined as a component carrier (hereinafter, CC). It has been discussed that up to 5 CCs can be used until Release-11 (Rel-11). By reference, a serving cell may consist of one downlink CC and one uplink CC. Alternatively, the serving cell may consist of one downlink CC. Since a CC may have a bandwidth of up to 20 MHz as in the LTE system, if 5 CCs are aggregated, the bandwidth can be extended to up to 100 MHz in this concept. A technique of aggregating and using a plurality of CCs is called a CA.

Figure 4:
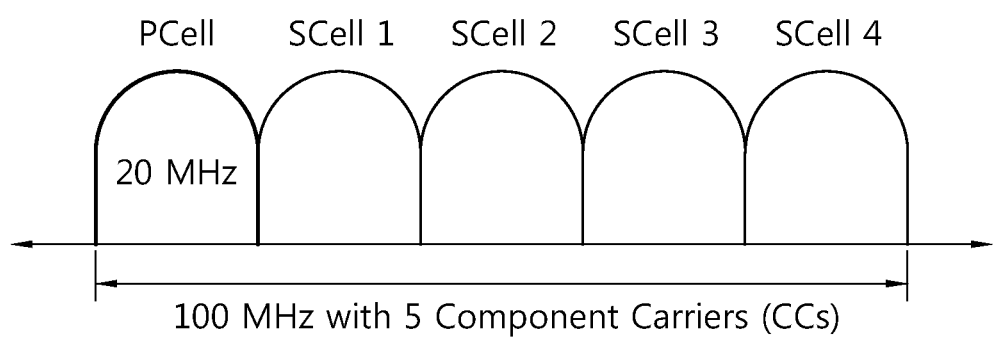
FIG. 4 shows a carrier aggregation (CA) technique that can be applied in a long term evolution-advanced (LTE-A) system.

FIG. 4 shows a CA technique that can be applied in an LTE-A system.

If the CA technique is applied, only one RRC connection exists between a UE and a network. Among a plurality of serving cells configured to be used by the UE, a serving cell which provides a security input (e.g., ECGI, PCI, ARFCN) and mobility information (e.g., TAI) of a non-access-stratum (NAS) to establish or re-establish an RRC connection is called a primary serving cell (PCell), and the other cells are called a secondary serving cell (SCell). In the present specification, the PCell may be called a primary cell, and the SCell may be called a secondary cell.

Figure 5:
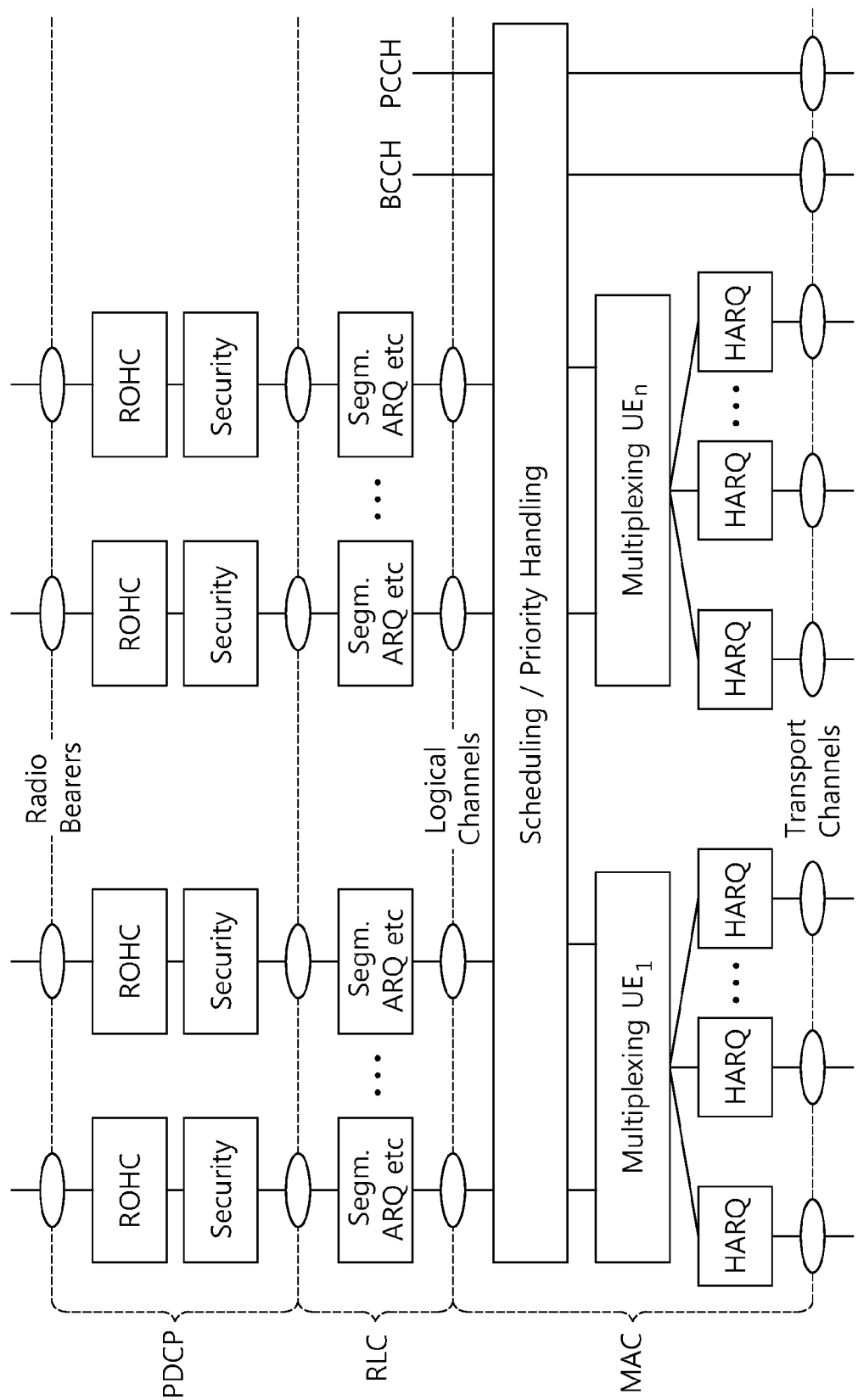
FIG. 5 shows a second downlink layer designed by considering a CA technique.

FIG. 5 shows a second downlink layer designed by considering a CA technique.

Figure 6:
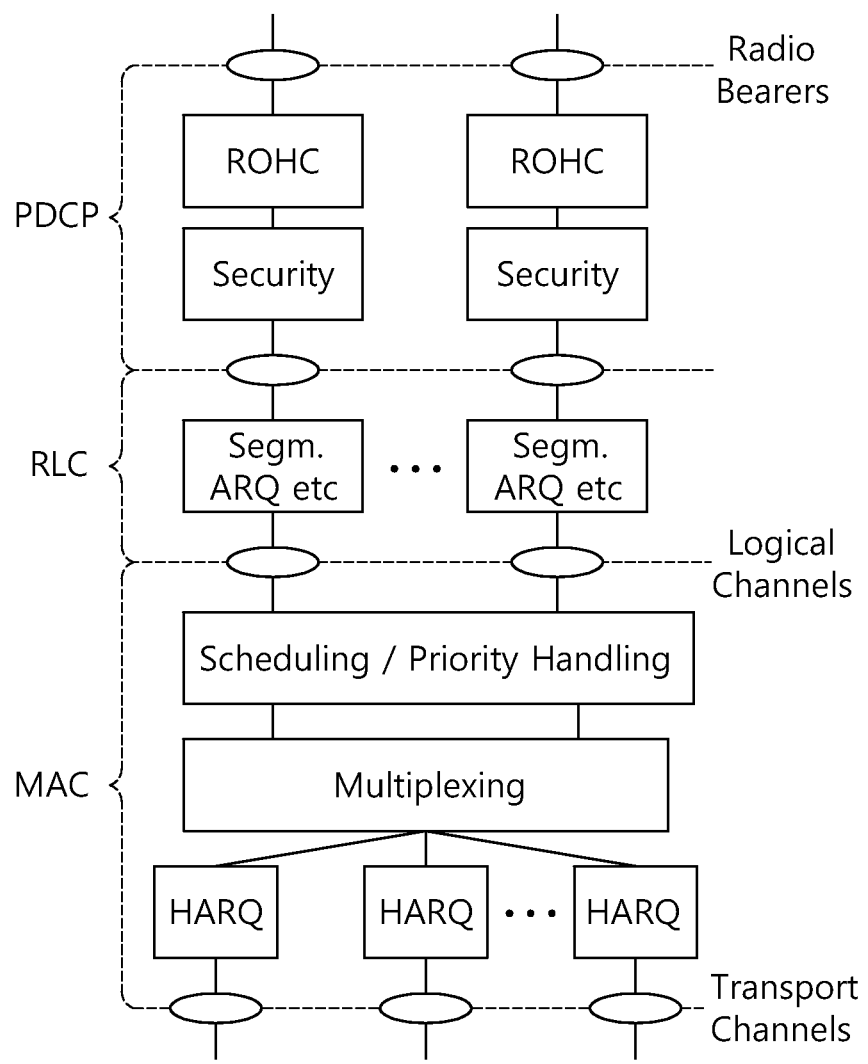
FIG. 6 shows a second uplink layer designed by considering a CA technique.

FIG. 6 shows a second uplink layer designed by considering a CA technique.

The CA technique has a great effect on a MAC layer of a layer 2. For example, since a plurality of CCs are used in the CA and one CC is managed in one HARQ entity, a MAC layer of an LTE-A system must perform operations related to a plurality of HARQ entities. In addition, in the CA, each HARQ entity can transmit or receive a plurality of transport blocks at the same time through the plurality of CCs since the transport blocks are processed independently.

Next, an uplink timing advance/alignment maintenance of an LTE system is described. In the LTE system based on an orthogonal frequency division multiplex (OFDM) technique, a time required for a signal transmitted by a UE to be arrived to an eNB may vary depending on a radius of a cell, a location of the UE in the cell, and a movement speed of the UE. That is, unless the eNB manages uplink transmission timing for each UE, there is a possibility that a transmission signal of one UE acts as an interference to a transmission signal of another UE, which leads to an increase in an error rate of a reception signal in the eNB side.

More specifically, in case of a UE which attempts transmission at a cell boundary, a time required for a transmitted signal to be arrived to the eNB may be longer than an arrival time of a signal transmitted by a UE located in a cell center. On the contrary, an arrival time of transmission of the UE located in the cell center may be relatively shorter than that of transmission of the UE located in the cell boundary. In the eNB side, data or signals transmitted by all UEs in the cell must be received within every valid time boundary to avoid an interference influence. Therefore, the eNB needs to properly adjust transmission timing of the UE according to a UE situation, and such an adjustment is called the timing advance/alignment maintenance.

A random access operation may be used as one method of the timing advance/alignment maintenance. That is, through the random access operation, the eNB receives a random access preamble transmitted by the UE, and calculates a timing advance value for advancing or delaying transmission timing of the UE, by using reception information of the random access preamble. In addition, through the random access response, the calculated timing advance value is reported to the UE, and the UE updates the transmitting timing by using the value. In another method, the eNB receives a sounding reference signal (SRS) transmitted periodically or randomly by the UE, calculates the timing advance value of the UE by using the received signal, and reports the value to the UE. Accordingly, the UE updates its transmission timing.

As described above, the eNB measures the transmitting timing of the UE by using a random access preamble or a sounding reference signal (SRS), and calculates a timing value to be corrected and reports it to the UE. Such a timing advance value transmitted by the eNB to the UE (that is, the timing value to be corrected) is called a timing alignment command (TAC). The TAC is processed in a MAC layer.

In addition, since the UE is not always present only in a fixed location, the transmission timing of the UE changes every time according to a UE's movement speed, location, etc. By considering this aspect, once the UE receives the TAC from the eNB, the UE must assume that the TAC is valid only during a specific time instead of regarding the TAC as being valid during an infinite time. For this, a time alignment timer (TAT) is used.

That is, upon receiving the TAC from the eNB, the UE starts the TAT. In addition, the UE assumes that uplink timing is aligned with the eNB. A value of the TAT may be delivered by using system information or an RRC signal such as a radio bearer reconfiguration. In addition, during the TAT is running, if a new TAC is received from the eNB, the UE restarts the TAT. Further, when the TAT is expired or when the TAT is not running, the UE assumes that timing is not aligned with the eNB, and the UE does not transmit any uplink signal, e.g., a PUSCH and PUCCH signal, other than a random access preamble.

Hereinafter, activation/deactivation of a secondary serving cell (i.e., secondary cell) in a CA technique is described.

When a UE uses a plurality of serving cells by applying the CA technique, an eNB may add or remove a secondary serving cell according to an uplink/downlink traffic situation of the UE. In addition, in order to optimize a signaling overhead for adding or removing the secondary serving cell, the eNB may adjust an activation state of the secondary serving cell, instead of removing the secondary serving cell. When in a deactivation state, the secondary serving cell may have the following feature.

An SRS is not transmitted in the secondary serving cell.
A CQI/PMI/RI/PTI for the secondary serving cell is not transmitted.
Uplink data is not transmitted in the secondary serving cell.
A PDCCH is not monitored in the secondary serving cell.
A PDCCH for the secondary serving cell is not monitored.
For this, the eNB may adjust an activation state of a specific secondary serving cell by transmitting to the UE an activation/deactivation command (more specifically, an activation/deactivation MAC control element) processed in a MAC layer.

Figure 7:
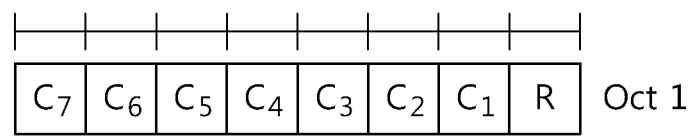
FIG. 7 is a diagram showing a detailed example of an activation/deactivation command for adjusting an activation state of a secondary serving cell.

FIG. 7 is a diagram showing a detailed example of an activation/deactivation command for adjusting an activation state of a secondary serving cell.

In a case where an eNB transmits an activation/deactivation command for deactivating the secondary serving cell, a UE may fail to receive this due to an error on a wireless network. In preparation for this, the UE must assume that the secondary serving cell is in a deactivation state if the secondary serving cell is not used for more than a specific time, instead of maintaining an activation state of the secondary serving cell for an infinite time. A secondary serving cell deactivation timer (sCellDeactivationTimer) is used for this.

The sCellDeactivationTimer runs for each secondary serving cell. The UE starts the sCellDeactivationTimer of the secondary serving cell upon receiving the activation/deactivation command, and restarts the deactivation timer upon receiving the activation/deactivation command for activating the cell or uplink/downlink resource allocation information for the activated secondary serving cell. If the sCellDeactivationTimer is expired or if the UE receives the activation/deactivation command for deactivation, the sCellDeactivationTimer of the cell stops running, and the cell transitions to a deactivation state.

Hereinafter, multiple timing advances in a CA technique is described.

When a UE uses a plurality of serving cells by applying the CA technique, since each serving cell may have a different frequency feature, a maintenance of multiple timing advances is necessary. When uplink transmission is attempted in a situation where transmission timing is not aligned among a plurality of serving cells, an inter-cell interference occurs. Similarly to an LTE system in which a timing advance maintenance is achieved for each user to decrease an interference between users, the CA technique reduces the inter-cell interference by properly adjusting uplink transmission timing of each serving cell having an uplink CC.

If the UE uses the plurality of serving cells, serving cells having a similar feature in terms of a timing advance change may exist among them according to a frequency feature. For example, serving cells in the same frequency band may show the similar feature in terms of the timing advance change. In the CA technique, in order to optimize multiple uplink timing advances, the serving cells having the similar feature in terms of the timing advance change are grouped, and this group is called a timing advance group (TAG). An eNB reports to the UE about information indicating to which TAG each serving cell belongs by using a TAG indicator of an RRC signal. One UE may have at least two or more TAGs, and a plurality of serving cells having a similar feature in terms of an uplink timing advance change may exist in one TAG. Among the plurality of serving cells in one TAG, at least one serving cell must have an uplink.

As described above, if a TAC is received from the eNB, the UE starts a TAT, and it is assumed that timing is aligned between the UE and the eNB only when the TAT is running. The UE which uses the CA technique achieves the timing advance maintenance for each TAG, and thus the TAT runs for each TAG. That is, the same timing advance change amount is applied to all serving cells in the same TAG, and if the TAT is expired, any uplink transmission is impossible through a serving cell of a corresponding TAG other than a preamble for a random access.

Figure 8:
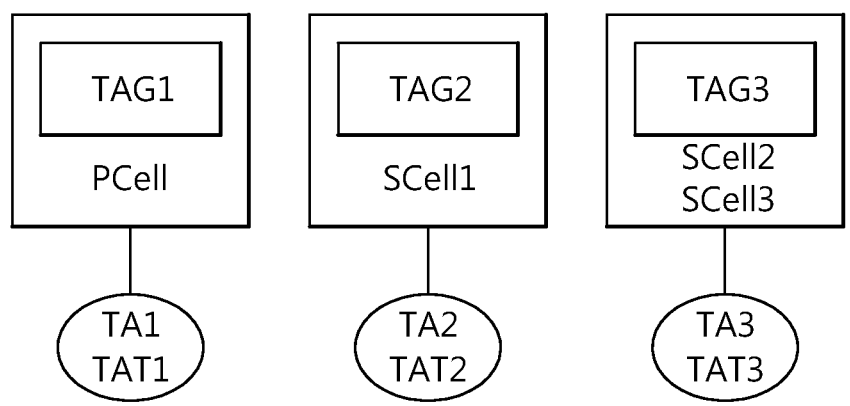
FIG. 8 shows an example of configuring a timing advance group (TAG) according to various types of cells.

FIG. 8 shows an example of configuring a TAG according to various types of cells.

A UE which uses a CA function by configuring a plurality of serving cells may conform to the following principle when adjusting an uplink timing advance.

A TAT value may differ for each TAG.
A TAG including a primary cell is called a primary TAG (pTAG), and a TAG not including the primary cell but consisting of only a secondary cell is called a secondary TAG (sTAG).

When an initial time advance is adjusted on a secondary serving cell belonging to the sTAG, a corresponding serving cell may start a random access process only by an order of an eNB. Even if uplink transmission is required, the random access process cannot start without the order of the eNB.

When a TAT of the sTAG is expired or does not run, it is assumed that serving cells in the sTAG are not time-aligned with the eNB.

When a TAT of a pTAG is expired or does not run, a TAT of another TAG cannot run, either. That is, it is assumed that all serving cells are not time-aligned with the eNB.

The UE selects any cell from activated serving cells in the sTAG and assumes the cell as a timing reference serving cell. The timing reference serving cell may also be called a timing reference cell.

The timing reference serving cell (i.e., the timing reference cell) is time-aligned in an uplink through a random access.

The eNB may activate/deactivate the secondary serving cell added to the UE according to traffic. When the secondary serving cell in the sTAG is activated, the UE starts/restarts a sCellDeactivationTimer of the secondary serving cell. Thereafter, if a timer (i.e., a deactivation timer) is expired or an activation/deactivation command for deactivating the secondary serving cell is received, the secondary serving cell transitions to a deactivation state. In this case, there is a case where the secondary serving cell unexpectedly transitions to the deactivation state. For example, if the timer is expired unexpectedly due to erroneous decoding or the like of the activation/deactivation command, the secondary serving cell transitions to the deactivation state.

When it is said that the timing reference serving cell (i.e., the timing reference cell) transitions to the deactivation state, it means that a timing advance change amount applied to all secondary serving cells in a corresponding sTAG is no longer valid. When uplink data transmission is attempted in the secondary serving cell in the sTAG, it may cause an interference to other serving cells. Therefore, it is required a mechanism in which the timing reference serving cell maintains an activation state so that the valid timing advance change amount is applied to the secondary serving cell in the sTAG.

Accordingly, the present specification proposes a method and apparatus for maintaining an activation state of a specific serving cell in a TAG. For example, it is proposed a method of maintaining an activation state of a specific secondary cell by avoiding a deactivation timer of a secondary cell from being expired.

That is, the present specification proposes a method and apparatus in which, when an eNB configures a TAG to a UE and adds a serving cell to the TAG, the UE maintains an activation state of a specific serving cell in the TAG. That is, the UE avoids a deactivation timer of a specific secondary cell, that is, the aforementioned sCellDeactivationTimer, from being expired. Preferably, the TAG is a sTAG consisting of only a secondary cell, and a serving cell added, deleted, and modified in the sTAG is a secondary cell.

More specifically, the UE may use the following method so that the sCellDeactivationTimer of the secondary cell is not expired and so that the serving cell maintains the activation state. That is, hereinafter, it is proposed a method of disabling a deactivation timer of a secondary cell. In the present specification, the term 'disable' may be used together with the term 'prohibition' or the like, and implies all mechanisms of temporarily or permanently preventing the timer from being expired. Various examples of disabling a deactivation timer are described below.

For example, the sCellDeactivationTimer may not be applied to a specific secondary cell. That is, the timer is not started/restarted, and if the timer is already running, the timer is stopped. In this manner, the deactivation timer can be disabled.

Additionally or alternatively, a sCellDeactivationTimer having an infinite value may be applied to a specific secondary cell. That is, the deactivation timer may be disabled by applying an infinite time value to the timer.

Preferably, if a specific indicator is received from an eNB, a UE disables the deactivation timer.

That is, in order to perform the above operation, the UE may receive from the eNB a deactivation prohibit command for maintaining an activation state of a specific secondary cell. The command may be an MAC signal or an RRC signal. In other words, the deactivation prohibit command is an example of the indicator.

Upon receiving the indicator (e.g., the deactivation prohibit command) from the eNB, the UE may perform the deactivation prohibit command on any secondary cell in a sTAG. For example, the secondary cell deactivation prohibit command may be performed on a timing reference cell in the sTAG. The timing reference serving cell may be determined according to the following criterion.

First, a secondary cell designated by the eNB may be configured as a timing reference cell.

Additionally or alternatively, a secondary cell to which an RACH configuration is configured by the eNB may be configured as the timing reference cell. The RACH configuration is delivered from the eNB to the UE, and may be included in system information such as SIB2 and the like. The RACH configuration may include resource information or the like for performing a random access performed by the UE at a later time.

Alternatively, a secondary cell to which an RACH configuration is configured by the eNB and of which a random access process is successfully complete may be configured as the timing reference cell.

The indicator for disabling the deactivation timer may identify the secondary cell in various manners. For example, the indicator may include an indicator and/or a sTAG indicator of the secondary cell in which the secondary cell deactivation prohibit command is performed. For example, upon receiving a secondary cell deactivation prohibit command including a secondary cell indicator from the eNB, the UE performs the secondary cell deactivation prohibit command on the secondary cell. If a secondary cell deactivation prohibit command including a sTAG indicator is received from the eNB, the UE performs the secondary cell deactivation prohibit command on a timing reference serving cell in a corresponding sTAG.

In addition, the indicator (e.g., the deactivation prohibit command) may selectively include information on a time duration in which the prohibit command is valid. If the UE receives the time duration information, the UE allows a corresponding sCellDeactivationTimer to run again after a valid time is elapsed. That is, the UE may start/restart the sCellDeactivationTimer.

Meanwhile, the indicator does not have to include an explicit deactivation prohibit command. That is, even if the prohibit command for prohibiting a deactivation of a specific secondary cell is not received, the sCellDeactivationTimer may not be allowed to be expired for the specific secondary cell. An example of the secondary cell for which the deactivation is prohibited may be as follows.

Even if there is no explicit deactivation prohibit command for the secondary cell to which the RACH configuration is configured by the eNB, a deactivation timer of a corresponding cell may be disabled. That is, even if an indicator not including an explicit command is received, the deactivation timer may be disabled.

Additionally or alternatively, the deactivation timer may be disabled as to the secondary cell to which the RACH configuration is configured by the eNB and of which the random access process is successfully complete.

For example, upon receiving an RACH configuration for a specific secondary cell from the eNB, the UE may perform the aforementioned operation so that the sCellDeactivationTimer is not expired for the secondary cell.

Figure 9:
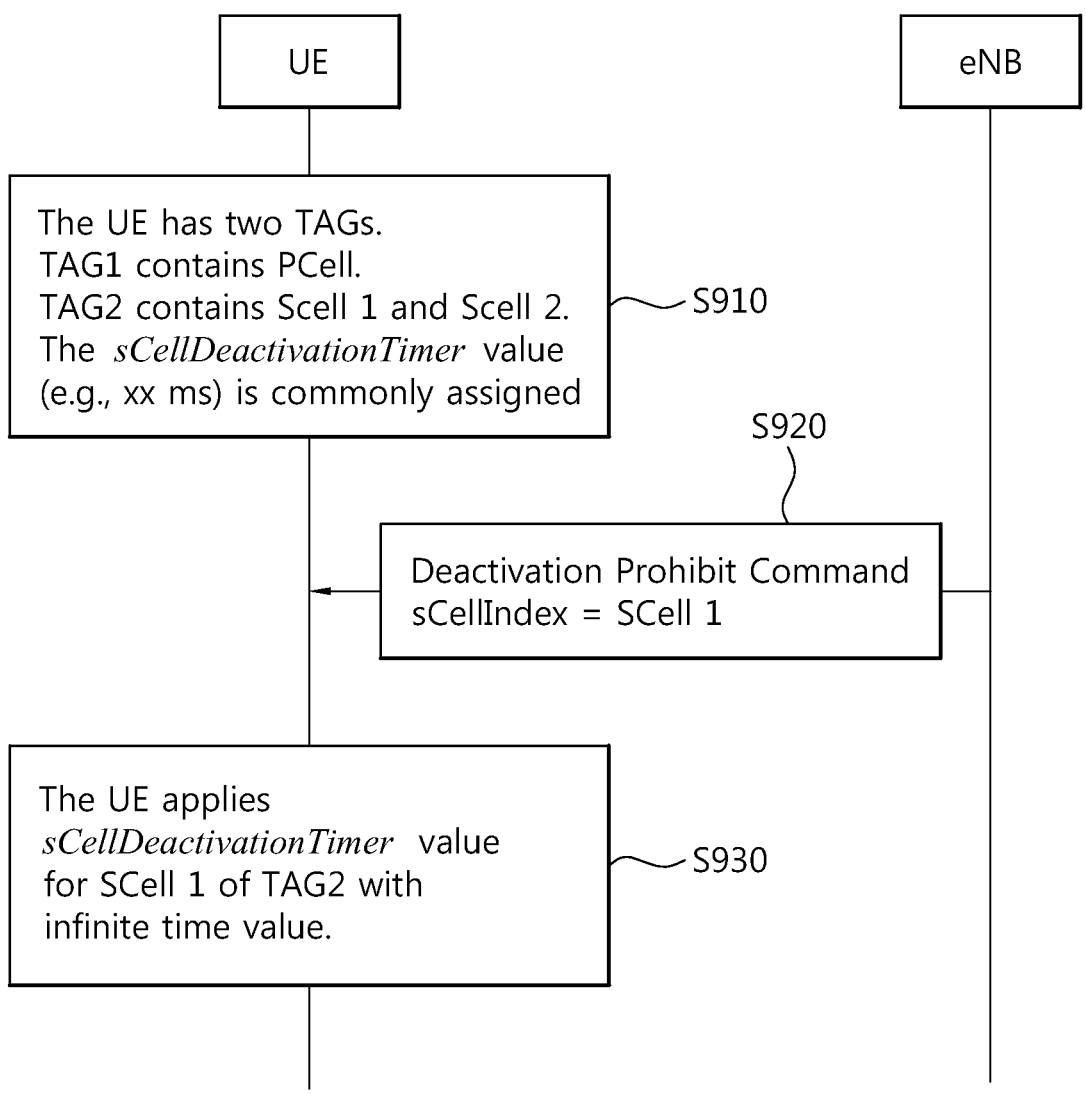
FIG. 9 shows an example of a method of controlling a deactivation timer according to the present specification.

FIG. 9 shows an example of a method of controlling a deactivation timer according to the present specification.

In step S910, a UE configures a primary cell and at least one secondary cell. More specifically, the UE may include two TAGs. For example, a TAG1 may include a primary serving cell, that is, a primary cell, and a TAG2 may include a secondary cell 1 (i.e., SCell 1) and a secondary cell 2 (i.e., SCell 2). The same sCellDeactivationTimer value is applied to the SCell 1 and the SCell 2 of the TAG2. A timer value applied equally to both of the two cells may be indicated by xx ms.

In step S920, the UE receives an indicator associated with a deactivation timer of a single secondary cell among the at least one secondary cell. In the example of FIG. 9, the indicator may be implemented with a deactivation prohibit command. More specifically, an eNB transmits a deactivation prohibit command for the SCell 1 to the UE by using a MAC signal or an RRC signal. As described above, the deactivation prohibit command may include index information indicating the SCell 1.

In step S930, the UE disables the deactivation timer of the single secondary cell on the basis of the indicator. Although it is exemplified in FIG. 9 that an infinite time value is applied to disable the deactivation timer for example, the aforementioned other methods may also be used. Meanwhile, upon receiving the MAC signal or the RRC signal, the UE applies the infinite value to a sCellDeactivationTimer value of the SCell 1. Accordingly, the deactivation timer for the SCell 1 is not expired.

Figure 10:
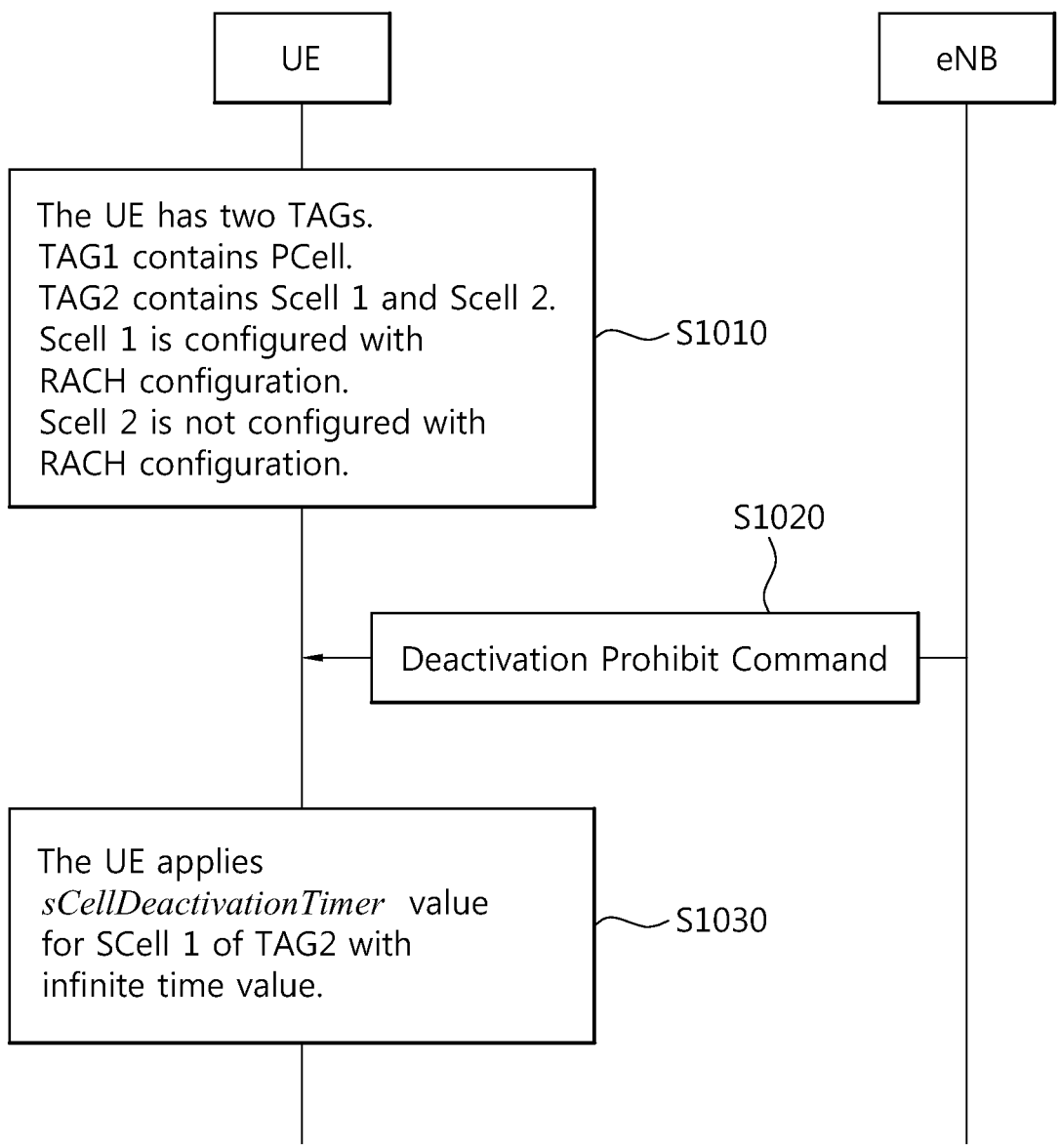
FIG. 10 shows an example of a method of controlling a deactivation timer according to the present specification.

FIG. 10 shows an example of a method of controlling a deactivation timer according to the present specification.

In step S1010, a UE configures a primary cell and at least one secondary cell. More specifically, the UE may include two TAGs. A TAG1 may include a primary serving cell, that is, a primary cell, and a TAG2 may include a secondary cell 1 (i.e., SCell 1) and a secondary cell 2 (i.e., SCell 2). An RACH configuration is configured in the SCell1 of the TAG2, whereas the RACH configuration is not configured in the SCell2.

In step S1020, the UE receives an indicator associated with a deactivation timer of a single secondary cell among the at least one secondary cell. In the example of FIG. 10, the indicator may be implemented with a deactivation prohibit command. More specifically, an eNB transmits a deactivation prohibit command to the UE by using a MAC signal or an RRC signal. In this case, the deactivation prohibit command may not include information for identifying the SCell1.

In step S1030, the UE disables the deactivation timer of the single secondary cell on the basis of the indicator. Although it is exemplified in FIG. 10 that an infinite time value is applied to disable the deactivation timer for example, the aforementioned other methods may also be used. Meanwhile, upon receiving the MAC signal or the RRC signal, the UE applies the infinite value to a deactivation timer value of a serving cell to which an RACH configuration is configured, that is, the SCell1. Therefore, regarding the SCell1, a sCellDeactivationTimer value is not expired.

Figure 11:
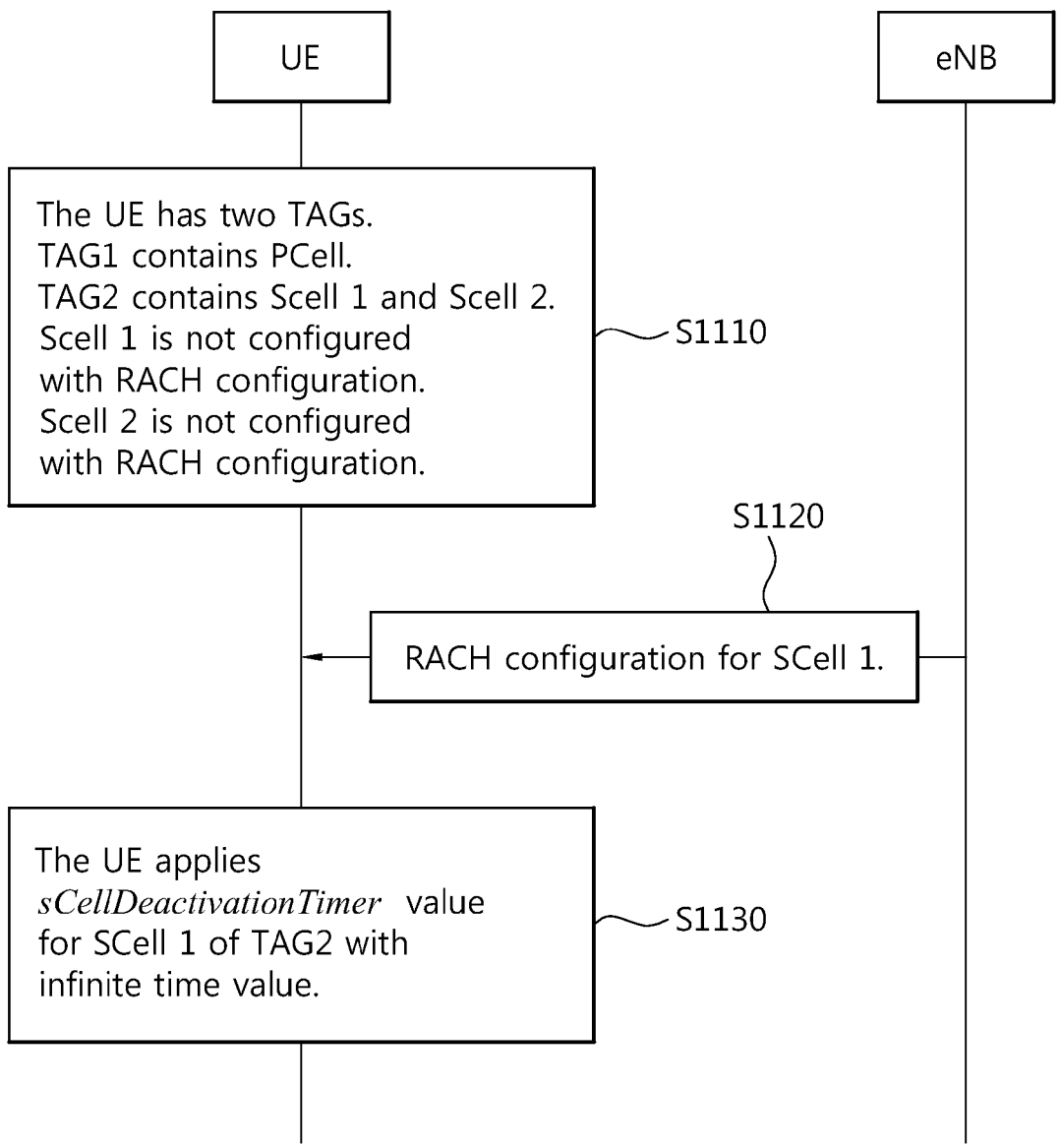
FIG. 11 shows an example of a method for controlling a deactivation timer according to the present specification.

FIG. 11 shows an example of a method for controlling a deactivation timer according to the present specification.

In step S1110, a UE configures a primary cell and at least one secondary cell. More specifically, the UE may include two TAGs. For example, a TAG1 may include a primary serving cell, that is, a primary cell, and a TAG2 may include a secondary cell 1 (i.e., SCell 1) and a secondary cell 2 (i.e., SCell 2). An RACH configuration may not be configured both in the SCell 1 and the SCell 2 of the TAG2.

In step S1120, the UE receives an indicator associated with a deactivation timer of a single secondary cell among the at least one secondary cell. In the example of FIG. 11, an eNB may configure an RACH configuration to the UE with respect to the SCell 1 by using the indicator.

In step S1130, the UE disables the deactivation timer of the single secondary cell on the basis of the indicator. Although it is exemplified in FIG. 11 that an infinite time value is applied to disable the deactivation timer for example, the aforementioned other methods may also be used. Meanwhile, upon receiving the MAC signal or the RRC signal, the UE applies the infinite value to a sCellDeactivationTimer value of a serving cell to which the RACH configuration is configured, that is, the SCell 1. Therefore, regarding the SCell1, a sCellDeactivationTimer is not expired.

Figure 12:
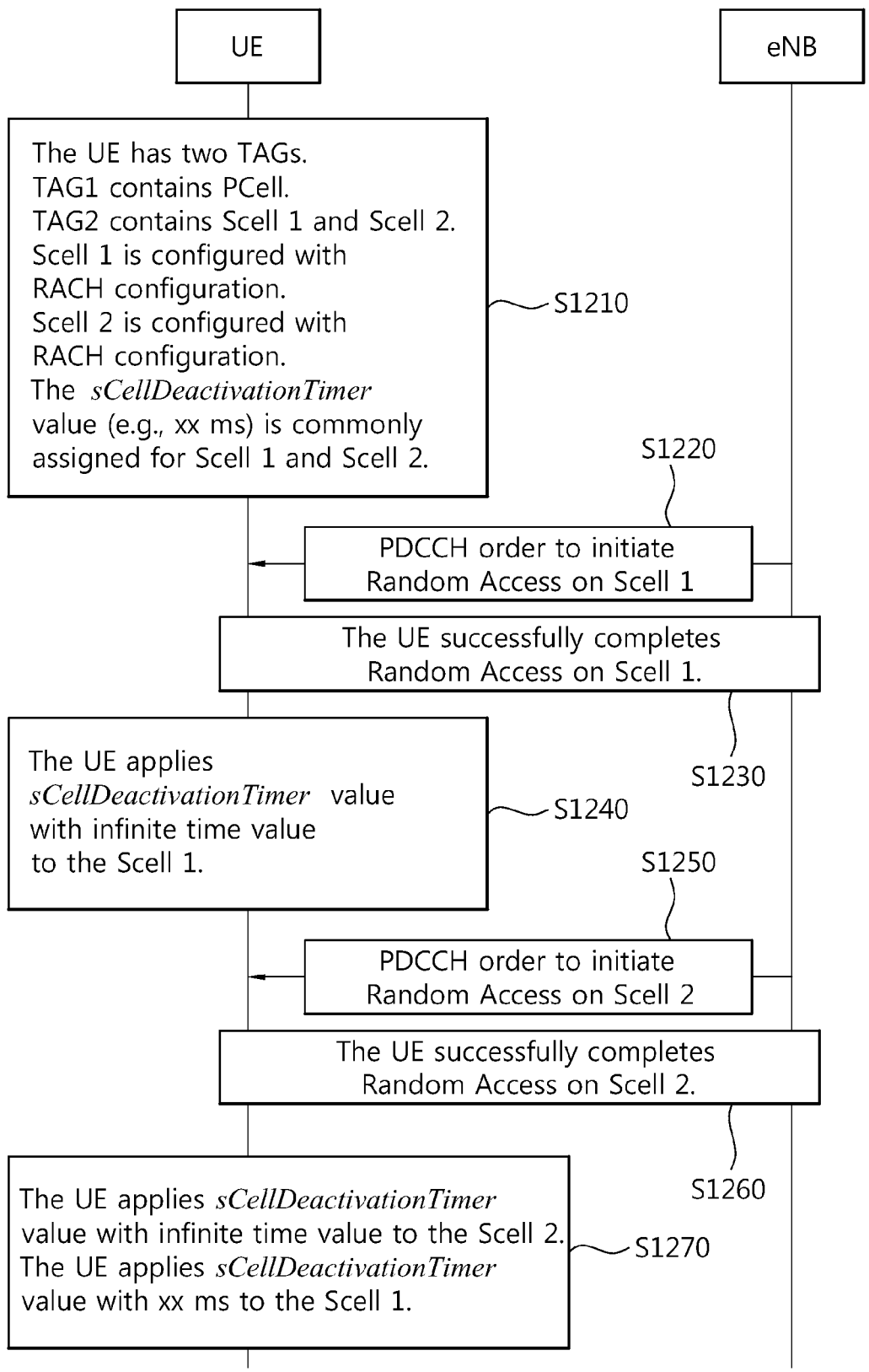
FIG. 12 shows an example of a method of controlling a deactivation timer according to the present specification.

FIG. 12 shows an example of a method of controlling a deactivation timer according to the present specification.

In step S1210, a UE configures a primary cell and at least one secondary cell. More specifically, the UE may include two TAGs. A TAG1 may include a primary serving cell, that is, a primary cell, and a TAG2 may include a secondary cell 1 (i.e., SCell 1) and a secondary cell 2 (i.e., SCell 2). RACH configurations are configured both in the SCell 1 and SCell 2 of the TAG2. The same sCellDeactivationTimer value may be used both in the SCell 1 and Cell 2 of the TAG2. A timer value applied equally to both of the two cells may be indicated by xx ms.

In step S1220, the UE receives an indicator associated with a deactivation timer of a single secondary cell among the at least one secondary cell. In the example of FIG. 12, a PDCCH order may be received by using the indicator. More specifically, an eNB may receive the PDCCH order so that the UE performs a random access for the SCell 1.

In step S1230, the UE may perform the random access in the SCell 1, and may successfully complete the random access.

In this case, in step S1240, the UE disables the deactivation timer for the SCell 1. Although it is exemplified in FIG. 12 that an infinite time value is applied to disable the deactivation timer for example, the aforementioned other methods may also be used. Meanwhile, the UE of FIG. 12 applies a sCellDeactivationTimer having an infinite value to the SCell 1. Accordingly, a timer of the SCell 1 is not expired.

Thereafter, in step S1250, the UE may receive a PDCCH order which instructs to perform a random access for the SCell 2. In addition, in step S1260, the UE may perform the random access in the SCell 2, and may successfully complete the random access.

In this case, in step S1270, the UE applies a sCellDeactivationTimer value used in a corresponding sTAG for the SCell 1. That is, an initially used timer value with 'xx' ms may be applied to the SCell 1. In this case, the SCell 1 transitions to a deactivation state when the timer is expired. The UE applies a sCellDeactivationTimer having an infinite value to the SCell 2 which successfully completes the random access. Accordingly, the timer of the SCell 2 is not expired.

It is proposed in the aforementioned example that, as to a timing reference serving cell in a TAG configured by the eNB to the UE, the UE allows the serving cell to maintain an activation state instead of expiring a sCellDeactivationTimer of the timing reference serving cell. In doing so, a problem is solved in which the UE causes an interference in uplink data transmission since an uplink timing advance of a secondary serving cell in a TAG is no longer valid.

Figure 13:
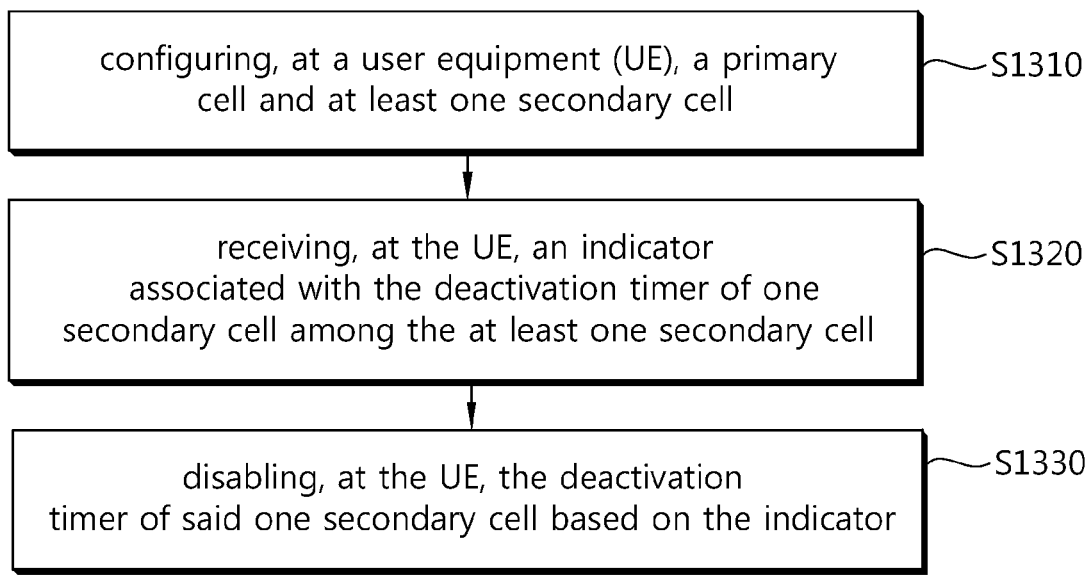
FIG. 13 shows an example of a method of controlling a deactivation timer according to the present specification.

FIG. 13 shows an example of a method of controlling a deactivation timer according to the present specification. The example of FIG. 13 relates to a method of controlling a deactivation timer of a cell in a mobile communication system.

In step S1310, a primary cell and at least one secondary cell may be configured at a UE. In this case, the primary cell is included in a pTAG, and the secondary cell is included in the pTAG or a sTAG.

In step S1320, the UE receives an indicator associated with a deactivation timer of a single secondary cell among the at least one secondary cell. As described above, the indicator may be received by using medium access control (MAC) signaling or radio resource control (RRC) signaling indicating the single secondary cell. In addition, the indicator may indicate an index indicating the single secondary cell. In addition, the indicator may indicate an index of the sTAG. The secondary cell indicated by the indicator may be a timing reference cell of the sTAG. Meanwhile, the indicator may indicate a time duration in which the deactivation timer of the single secondary cell is disabled.

In step S1330, the UE disables the deactivation timer of the single secondary cell on the basis of the indicator. In this case, the deactivation timer may be disabled by using a method of applying an infinite timer value to the deactivation timer.

FIG. 14 shows an apparatus to which the aforementioned method is applied. The aforementioned method may be implemented by a UE 1000 as an apparatus for transmitting control information through an uplink. The UE 1000 may communicate with an eNB 1100.

The UE 1000 includes a processor 1010, a memory 1030, and a radio frequency (RF) unit 1020. The processor 1010 can allocate a radio resource according to externally provided information, internally pre-stored information, etc. The processor 1010 can implement procedures, methods, and functions performed by the UE in the aforementioned embodiments. The memory 1030 is coupled to the processor 1010, and stores a variety of information for driving the processor 1010. The RF unit 1020 is coupled to the processor 1010, and transmits and/or receives a radio signal.

The eNB 1100 which communicates with the UE includes a processor 1110, a memory 1120, and an RF unit 1130. The processor 1110 can implement procedures, methods, and functions performed by the BS in the aforementioned embodiments. The memory 1120 is coupled to the processor 1110, and stores a variety of information for driving the processor 1110. The RF unit 1130 is coupled to the processor 1110, and transmits and/or receives a radio signal.

The processors 1010 and 1110 may include an application-specific integrated circuit (ASIC), a separate chipset, a logic circuit, and/or a data processing unit. The memories 1030 and 1120 may include a read-only memory (ROM), a random access memory (RAM), a flash memory, a memory card, a storage medium, and/or other equivalent storage devices. The RF units 1020 and 1130 may include a base-band circuit for processing a radio signal. When the embodiment is implemented in software, the aforementioned methods can be implemented with a module (i.e., process, function, etc.) for performing the aforementioned functions. The module may be stored in the memories 1030 and 1120 and may be performed by the processors 1010 and 1110. The memories 1030 and 1120 may be located inside or outside the processors 1010 and 1110, and may be coupled to the processors 1010 and 1110 by using various well-known means.

The aforementioned method and apparatus can be implemented with hardware, software, or combination thereof. In hardware implementation, it can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, it can be implemented with a module for performing the aforementioned functions. Software is storable in a memory unit and executed by the processor. Various means widely known to those skilled in the art can be used as the memory unit or the processor.

What is claimed is:

1. A method of controlling a deactivation timer of a cell in a mobile communication system, the method comprising:
   configuring, at a user equipment (UE), a primary cell (P-Cell) and at least one secondary cell (S-Cell) including a first S-Cell;
   configuring, at the UE, the deactivation timer for the first S-Cell based on a pre-defined deactivation time value, wherein the deactivation timer is configured to start when an medium access control (MAC) layer command activates the at least one S-Cell;
   receiving, at the UE, a physical downlink control channel (PDCCH) order initiating random access for the first S-Cell;
   if there is no S-Cell whose deactivation timer has been disabled by successful completion of random access, disabling, at the UE, the deactivation timer of the first S-Cell; and
   if there is an S-Cell whose deactivation timer has been disabled by successful completion of random access, disabling, at the UE, the deactivation timer of the first S-Cell and applying the pre-defined deactivation time value to the S-Cell whose deactivation timer has been disabled by successful completion of random access.

2. The method of claim 1, wherein the at least one S-Cell is included in a secondary timing advance group (TAG).

3. The method of claim 2, wherein the first S-Cell is a timing reference cell of the secondary TAG.

4. The method of claim 1, wherein the deactivation timer of the first S-Cell is disabled by applying an infinite time value.

5. The method of claim 1, wherein the at least one S-Cell includes a second S-Cell.

6. A user equipment (UE) for controlling a deactivation timer of a cell in a mobile communication system, the UE comprising:
   a transceiver configured to receive and/or transmit a signal; and
   a processor coupled to the transceiver and configured to:
   configure a primary cell (P-Cell) and at least one secondary cell (S-Cell) including a first S-Cell:
   configure the deactivation timer for the first S-Cell based on a pre-defined deactivation time value, wherein the deactivation timer is configured to start when an medium access control (MAC) layer command activates the at least one S-Cell;
   receive a physical downlink control channel (PDCCH) order initiating random access for the first S-Cell;
   if there is no S-Cell whose deactivation timer has been disabled by successful completion of random access, disable the deactivation timer of the first S-Cell; and
   if there is an S-Cell whose deactivation timer has been disabled by successful completion of random access, disable the deactivation timer of the first S-Cell and apply the pre-defined deactivation time value to the S-Cell whose deactivation timer has been disabled by successful completion of random access.

* * * * *